(12) United States Patent
Yonekura

(10) Patent No.: US 11,526,720 B2
(45) Date of Patent: Dec. 13, 2022

(54) ARTIFICIAL INTELLIGENCE SYSTEM FOR SUPPORTING COMMUNICATION

(71) Applicant: alt Inc., Tokyo (JP)

(72) Inventor: Kazutaka Yonekura, Tokyo (JP)

(73) Assignee: ALT INC., Tokyo (JP)

( * ) Notice: Subject to any disclaimer, the term of this patent is extended or adjusted under 35 U.S.C. 154(b) by 891 days.

(21) Appl. No.: 16/220,457

(22) Filed: Dec. 14, 2018

(65) Prior Publication Data

US 2019/0122093 A1 Apr. 25, 2019

Related U.S. Application Data

(63) Continuation of application No. PCT/JP2017/022185, filed on Jun. 15, 2017.

(30) Foreign Application Priority Data

Jun. 16, 2016 (JP) .............................. JP2016-119697

(51) Int. Cl.
*G06F 3/048* (2013.01)
*G06N 3/00* (2006.01)
(Continued)

(52) U.S. Cl.
CPC ........... *G06N 3/006* (2013.01); *G06F 16/337* (2019.01); *G06F 16/583* (2019.01); *G06F 16/90332* (2019.01); *G06F 16/951* (2019.01); *G06F 16/9535* (2019.01); *G06N 3/00* (2013.01); *G06N 20/00* (2019.01); *G06Q 50/01* (2013.01)

(58) Field of Classification Search
CPC ...... G06N 3/006; G06N 20/00; G06F 16/337; G06F 16/583; G06F 16/90332; G06F 16/9535; G06F 16/951; G06Q 50/01
See application file for complete search history.

(56) References Cited

U.S. PATENT DOCUMENTS 10,540,412 B2 * 1/2020 Takahashi .............. G06Q 50/01
2013/0080287 A1 3/2013 Currie
(Continued)

FOREIGN PATENT DOCUMENTS

CN 100423420 C 10/2008
CN 104270348 A 1/2015
(Continued)

OTHER PUBLICATIONS

Office Action issued in Chinese Appln. No. 201780037483.4 dated Mar. 31, 2021. English translation provided.
(Continued)

*Primary Examiner* — Rashawn N Tillery
(74) *Attorney, Agent, or Firm* — Rossi, Kimms & McDowell LLP

(57) ABSTRACT

An artificial intelligence system includes a first information processing module generating data related to a language based on social data of a first user registered in one or a plurality of social network services, and a second information processing module generating data related to an image based on social data of the first user registered in one or a plurality of social network services. The first information processing module and the second information processing module generate a virtual first user on a computer with respect to the first user.

12 Claims, 13 Drawing Sheets

(51) Int. Cl.
*G06F 16/335* (2019.01)
*G06Q 50/00* (2012.01)
*G06F 16/583* (2019.01)
*G06F 16/9032* (2019.01)
*G06N 20/00* (2019.01)
*G06F 16/9535* (2019.01)
*G06F 16/951* (2019.01)

(56) References Cited

U.S. PATENT DOCUMENTS

| | | | | |
|---|---|---|---|---|
| 2014/0019443 | A1* | 1/2014 | Golshan | G06F 16/9535 707/723 |
| 2015/0058417 | A1 | 2/2015 | McConnell et al. | |
| 2016/0098937 | A1* | 4/2016 | Boyer | G06F 16/285 434/350 |
| 2017/0091270 | A1* | 3/2017 | Guo | G06K 9/6215 |
| 2018/0018562 | A1* | 1/2018 | Jung | G06F 40/30 |
| 2019/0327330 | A1* | 10/2019 | Natarajan | G06F 16/24575 |
| 2019/0362253 | A1* | 11/2019 | Francis | G06Q 50/01 |

FOREIGN PATENT DOCUMENTS

| | | | |
|---|---|---|---|
| CN | 105144286 A | | 12/2015 |
| CN | 105229687 A | | 1/2016 |
| JP | 2005092540 A | | 4/2005 |
| JP | 2005196356 A | * | 7/2005 |
| JP | 2005196356 A | | 7/2005 |
| JP | 2012076162 A | | 4/2012 |
| JP | 2013210792 A | | 10/2013 |
| JP | 2013210792 A | * | 10/2013 |
| JP | 2013214127 A | | 10/2013 |
| JP | 2014137706 A | | 7/2014 |
| JP | 2014137706 A | * | 7/2014 |
| JP | 2016057669 A | | 4/2016 |
| WO | 2004006418 A2 | | 1/2004 |
| WO | 2014145149 A1 | | 9/2014 |
| WO | 2014159037 A1 | | 10/2014 |
| WO | 2016104736 A1 | | 6/2016 |

OTHER PUBLICATIONS

International Search Report issued in Intl. Appln. No PCT/JP2017/022185 dated Jul. 25, 2017. English translation provided.

Written Opinion issued in Intl. Appln. No. PCT/JP2017/022185 dated Jul. 25, 2017.

Nishimura. "al + copies the personality and works on your behalf Artificial intelligence avatar on the cloud." AI scores possibilities. TechCrunch. Jan. 27, 2015. English translation provided.

Dream Gate. "Immediate commercialization! Service that creates artificial intelligence that can be said to be his own alteration by copying and rebuilding individual personality "al + (Orz)"." Sep. 15, 2015. [retrieval date Jul. 11, 2017]. URL: http://www.dreamgate.gr.jp/news/4004. English translation provided.

Alt Inc. "Ortz Corporation, the world's first personal artificial intelligence (PAI) application "al + (Ortz)" began delivery from Mar. 2015 for iOS. (Patent applied)." ORZU Corporation. News2u.net. Jan. 28, 2015. [retrieval date Jul. 11, 2017] URL:http://www.news2u.net/releases/131902. English translation provided.

English translation of Written Opinion issued in Intl. Appln. No. PCT/JP2017/022185 dated Jul. 25, 2017, previously cited in IDS filed Dec. 14, 2018.

Office Action issued in Japanese Appln. No. 2016-119697 dated May 12, 2020. English machine translation provided.

* cited by examiner (B)

ARTIFICIAL INTELLIGENCE SYSTEM FOR SUPPORTING COMMUNICATION

CROSS REFERENCE TO RELATED APPLICATIONS

This application is based upon and claims the benefit of priority from the prior Japanese Patent Application No. 2016-119697, filed on Jun. 16, 2016, and PCT Application No. PCT/JP2017/022185 filed on Jun. 15, 2017, the entire contents of which are incorporated herein by reference.

FIELD

An embodiment of the present invention is related to a system which uses artificial intelligence and is related to a technology for generating a virtual person reflecting his/her personality on the system and achieving communication with natural person.

BACKGROUND

As the use of social networking services has become widespread, it has become possible for a plurality of users to transmit and share information using devices such as smartphones, tablet terminals and personal computers. As a result, the amount of information that an individual can acquire or transmit has increased, the scope of this increase was significantly expanded. It is easy to share information with ma plurality of people at the same time by operating application software installed in a terminal device. The content of communication can be communicated not only by audio and characters but also by still images and moving images and thus the amount and quality of information is increasing.

These social networking services directly perform communication between people via a computer. On the other hand, the development of robots which resemble the appearance and movement of humans and communicate in natural languages with human beings is progressing (see, for example, Japanese Unexamined Patent Application Publication No. 2012-076162). In addition, a technology for generating a virtual pet or an anthropomorphized avatar on a computer and performing communication is disclosed (for example, see Japanese Unexamined Patent Application Publication No. 2005-092540).

However, these communication technologies are uniform and cannot exhibit individuality. In addition, in a conversation between natural persons, for example, although an apple is conceived as a commonly recognized fruit by all people from the text data "apple", upon hearing "apple", user A thinks imagines it is a red apple, and user B imagines it is a green apple, and thus the concepts of everyone do not necessarily match. That is, a virtual communication entity generated by a computer, or an anthropomorphized entity cannot fully demonstrate or reflect the individuality of an individual. For example, although it is possible to generate an avatar (a character that becomes an alter ego of oneself) on a computer, it is not possible to follow the person's individuality or demonstrate its individuality.

SUMMARY

An artificial intelligence system in an embodiment according to the present invention includes a first information processing module generating data related to a language based on social data of a first user registered in one or a plurality of social network services, and a second information processing module generating data related to an image based on social data of the first user registered in one or a plurality of social network services. The first information processing module and the second information processing module generate a virtual first user on a computer with respect to the first user.

DESCRIPTION OF EMBODIMENTS

Figure 1:
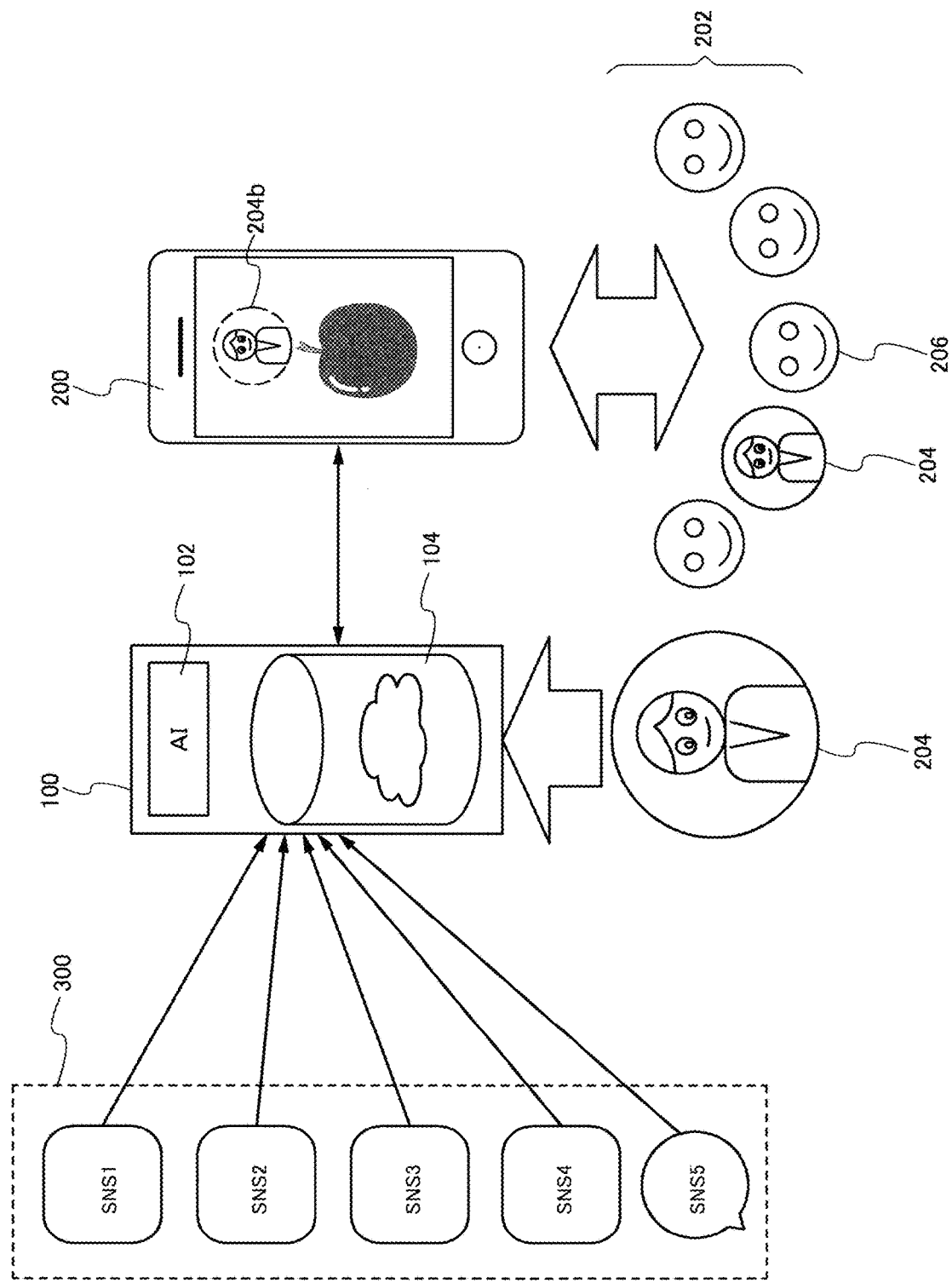
FIG. 1 is a diagram showing the relationship between an artificial intelligence system related to one embodiment of the present invention, a social networking service and a terminal device belonging to a user side which uses the artificial intelligence system.

The embodiments of the present invention are explained below while referring to the drawings. However, the present invention can be implemented in various aspects and should not to be interpreted as being limited to the description of the embodiments exemplified below. In addition, although the drawings may be schematically represented in terms of width, thickness, shape, and the like of each part as compared with their actual mode in order to make explanation clearer, it is only an example and an interpretation of the present invention is not limited. In addition, in the present specification and each drawing, the same reference numerals are provided to the same elements as those described previously with reference to preceding figures and a detailed explanation may be omitted accordingly.

Summary of Artificial Intelligence System

FIG. 1 shows the relationship between an artificial intelligence system 100 according to one embodiment of the present invention, a plurality of social networking services 300 (Hereinafter, the social networking services is also called referred "SNS".), and a terminal device 200 which belongs to a user side using the artificial intelligence system 100. The artificial intelligence system 100 according to the present embodiment has a function for acquiring and learning social data from various site of the SNS 300 which a user uses.

Furthermore, in the present specification, "social data" means information such as characters (including emoji or emotion), symbols, audio, still images or moving image, or a combination of these which a user uses to transmit to a specific person (for example, another user registered as a friend) or the public. In addition, "personal social data" indicates social data which belongs to a specific person among a plurality of users.

The artificial intelligence system 100 has a function for acquiring data from at least one or more site of the SNS 300 used by a plurality of users 202 and accumulating them in a database 104. The artificial intelligence system 100 further includes an information processing module 102 having a calculation processing device for inferring and learning the thoughts a user based on the information accumulated in the database 104. The information processing module 102 has a function for performing machine learning (an artificial intelligence function). The artificial intelligence system 100 generates a virtual user on a computer system which reflects the individuality of each user by machine learning, and performs various communication with a real user who is a natural person or other users.

Here, artificial intelligence is realized by using hardware resources and software resources for intelligent functions such as reasoning and judgment, and may be recognized as a concept which includes a database for storing data as knowledge. In addition, artificial Intelligence has a learning function and may also can have the capability to recognize images and understand natural languages using this learning.

The artificial intelligence system 100 creates images conceptualized by a natural person with regards to various things and events by machine learning of social data acquired from one or more site of the SNS 300, and generates the images as a generalized model. For example, by using social data of the plurality of users 202 who are registered in one or more site of the SNS 300 as learning materials, a common concept with respect to a specific thing which is held by a plurality of people can be imaged as a generalized model by deep learning. For example, when "apple" is the target thing, the artificial intelligence system 100 machine learns the social data acquired from one or more site of the SNS 300, and a model (image) which can be commonly recognized by plurality of users as "apple" is extracted from the social data or an appropriate image is generated using the social data. Furthermore, deep learning refers to machine learning which uses a multilayer neural network in which information processing is carried out by a computer.

In addition, the artificial intelligence system 100 has a function for adapting a generalized model to a model which matches the individuality of the specific person based on personal social data which belongs to the specific individual among a plurality of users. For example, when a generalized model of "apple" is "red apple", in the case where it is judged that there is strong tendency to conceptualize (image) a "green apple" from the content of personal social data of the specific person, an image of a personality model of a "green apple" is generated or extracted as a personality model.

As is shown in FIG. 1, the artificial intelligence system 100 is placed in a state where it can be accessed by the terminal device 200 which belongs to each of the plurality of users 202 through an electric communication line. The plurality of users 202 can directly and indirectly achieve communication with a virtual user which is generated on the computer system by a service provided by the artificial intelligence system 100.

It is preferred that the plurality of users 202 is a group of users who are registered in advance in order to receive a service provided via the artificial intelligence system 100. It is possible to increase the security and reliability of communication by making usage of the service provided via the artificial intelligence system 100 a registration system.

Furthermore, it is not absolutely necessary for all of the plurality of users 202 to be registered in advance in order to receive a service provided via the artificial intelligence system 100. For example, it is sufficient that at least one of the plurality of users 202 is able to use the artificial intelligence system 100 as an anonymous user.

The artificial intelligence system 100 is placed in a state where it can communicate with one or more site of the SNS 300 which are provided to the public and is in a state in which it is possible to acquire social data. As the sites of the SNS 300, for example, blogs which mainly display photographs and articles which are operated and posted by individuals or groups of several people in chronological order, sites on which characters and images can be posted such as Twitter (registered trademark), Facebook (registered trademark), Messenger or LINE and the like, and may also include other various communication services provided on the Internet. Furthermore, there are various forms of the communication which are provided by the SNS 300 and is not limited to the services exemplified above. In the present embodiment, it is preferred that the SNS 300 which is linked with the artificial intelligence system 100 provides social data of the user and is in a form in which information can be shared among a plurality of users.

The artificial intelligence system 100 acquires social data from at least one or more site of the plurality of SNS 300. Acquisition of social data by the artificial intelligence system 100 may be performed in real time or may be performed at regular intervals or for each regular interval. The artificial intelligence system 100 accumulates the acquired social data in the database 104. In order to increase the amount and quality of information stored in the database, it is preferred that the artificial intelligence system 100 acquires the social data while linked with many sites of the SNS 300.

The following modes are exemplified as an example of a process for acquiring social data from one or more site of the SNS 300 and accumulating the acquired social data in the database 104. First, a first user 204 registers the attributes of the first user 204 in the artificial intelligence system 100 using a terminal device such as a personal computer or a multi-function mobile phone called "smartphone". At this time, the first user 204 registers the SNS information belonging to themselves which they will provide to the artificial intelligence system 100.

The attributes of the first user 204 are stored in the database 104 of the artificial intelligence system 100. The artificial intelligence system 100 accesses a site of the SNS 300 which is registered by the first user 204 and acquires personal social data related the first user 204. In the personal social data related to the first user 204, the first user 204 includes information transmitted by the first user 204 or information related to a conversation with another user in the site of the SNS 300. That is, the personal social data includes text data, image data (still images and moving images), and audio data.

The artificial intelligence system 100 similarly acquires social data from one or more site of the SNS 300 related to other users. The social data acquired from one or more site of the SNS 300 may be social data of all users or arbitrarily extracted social data.

The artificial intelligence system 100 performs machine learning using an information processing module 102 which has a function as artificial intelligence with respect to social data of the plurality of users 202, and generates a generalized model. Specifically, image recognition is performed by deep learning with respect to various events. In this way, a general model shown as common recognition by a plurality of users is generated or extracted as image data. For example, if it is an "apple", image data which can be commonly recognized by any one of a plurality of users as an "apple" is generated or extracted. In addition, a general model is generated for the characteristics of an individual among a group of a plurality of people included in the plurality of users 202 who is identified as common recognition, and which indicates that individual. For example, in the case of "Mr. Tanaka" in a group of a plurality of people, the face of Mr. Tanaka is extracted as image data. The artificial intelligence system 100 registers the image data in the database 104 as a generalized model. The generalized model is generated for a variety of things such as animals such as "cat" or "dog", food such as "orange", "cabbage" or "beef (meat)", buildings such as "building" or "bridge" or the "face" or "appearance" of a specific person.

The artificial intelligence system 100 performs deep learning with respect to a specific user (for example, the first user 204) using the personal social data which is acquired from one or more site of the SNS 300 and generates a personality model. The personality model which is created for a certain thing or event may be the same as or different from the generalized model. For example, in the case of specifying "red apple" in the generalized model with respect to "apple", in the personality model, the image of a "green apple" may be registered in the database 104 as reflecting the contents of personal social data. This is because in the case where the personal social data includes many images related to "green apple" or appears many times in data of a conversation, the image of or the conversation about the "green apple" is weighted with a relatively large number as a whole as social data of the nearest person. In addition, in the case of "Tanaka-san" among a group of a plurality of people, although the face of the corresponding Mr. Tanaka is extracted as image data, in the case where all the family members of Mr. Tanaka are conceptualized (imaged) from personal social data for a specific user, a group photo of Mr. Tanaka's family is registered in the database 104 as a personalization model.

The attributes of the first user 204 are stored in the database 104 of the artificial intelligence system 100. The attributes of the first user 204 include information (SNS specific information) for specifying whether social data is acquired from any site of the SNS 300, and authentication information of the first user 204 in the SNS for acquiring social data. The artificial intelligence system 100 accesses a site of the SNS 300 specified by the SNS specifying information using the SNS specifying information and the SNS authentication information and accesses the SNS specified by the SNS specific information using the SNS specific information and the SNS authentication information accesses the site of the SNS 300 using the authentication information of the first user 204, and performs a login process instead of the first user 204. Next, the artificial intelligence system 100 acquires information related to the first user 204 which is stored in the site of the SNS 300, that is, acquires personal social data. The information related to the first user 204 includes messages exchanged by the first user 204 with a specific user in the SNS 300, or articles, pictures, audio information or video (which may include audio information) posted by the first user 204 to the site of the SNS 300.

The artificial intelligence system 100 stores information related to the first user 204 acquired from the site of the SNS 300 in the database 104. In this case, the artificial intelligence system 100 set the information related to the first user 204 acquired from the site of the SNS 300 as it is in the database 104. Alternatively, the artificial intelligence system 100 may process the information related to the first user 204, store it in the database 104, and temporarily accumulate the information according to the attributes or details of the acquired information.

For example, in the case where the first user 204 has a conversation with another user using a certain site in some site of the SNS 300, when response information to a question from another user is acquired, a question from another user and a response of the first user 204 to that question are correlated with each other and stored in the database 104. The question and response information may include not only text data but also data such as photographs, video and audio and the like. In this case, the database 104 may be formed from a plurality of regions (sub-databases or tables and the like), and may include a region where questions are stored and a region where responses are stored. Therefore, in the region where a question is stored, a question from the other user is stored, and the response of the first user 204 is stored in the region where responses are stored. In addition, a question from other users and the responses from the first user 204 are correlated with each other, and for example, information for correlating is stored in a third region. For example, a group of a main key for a question and a main key for a response is stored in the third region.

Furthermore, in the case when all the information related to the first user 204 is acquired from a site of the SNS 300 which is specified by the SNS specific information and but is not accumulated in a database, the artificial intelligence system 100 may display the ratio of all the information related to the user 204 of the information accumulated in the database to the first user 204. In this way, the first user 204 can know the extent of the accumulation information, for example, it is possible for the artificial intelligence system 100 to determine whether to respond instead of the first user 204 to a question from any one of the plurality of users 202. In addition, by displaying the degree of accumulation of this type of information to the plurality of users 202, it is also possible to predict the appropriateness of a response to a question.

FIG. 1 shows a form in which a second user 206 other than the first user 204 converses with the first user 204 via the artificial intelligence system 100. Communication which is performed via the artificial intelligence system 100 is not a direct exchange of messages between the first user 204 and the second user 206, but is a form in which a virtual first user 204b generated on a computer by the artificial intelligence system 100 converses with a real second user 206. In this case, an image imagined by the first user 204 according to the contents of the conversation is displayed on the terminal device 200 of the second user 206. For example, when the second user 206 is talking about an "apple" with the virtual first user 204b, an image of a "green apple" which is strongly imaged by the first user 204 is displayed on the screen of the terminal device 200. At this time, although the second user 206 may be imagine a "red apple", by knowing that it is a "green apple" being imaged by the first user 204 in the conversation, the conversation processed from a new point of view, and it is possible to achieve a rich communication.

Furthermore, the privacy of a user should be secured even for social data provided from the SNS 300. The artificial intelligence system 100 according to the present embodiment is can reflect information which is set by a user in each site of the SNS 300. For example, in the case where a user using a certain site of the SNS 300 sets their personal profile to private, and sets messages to be posted on the SNS to be public, and in the case where the range of disclosure is set so that each message is either public or private, it is possible for the artificial intelligence system 100 to take over these settings.

Figure 2:
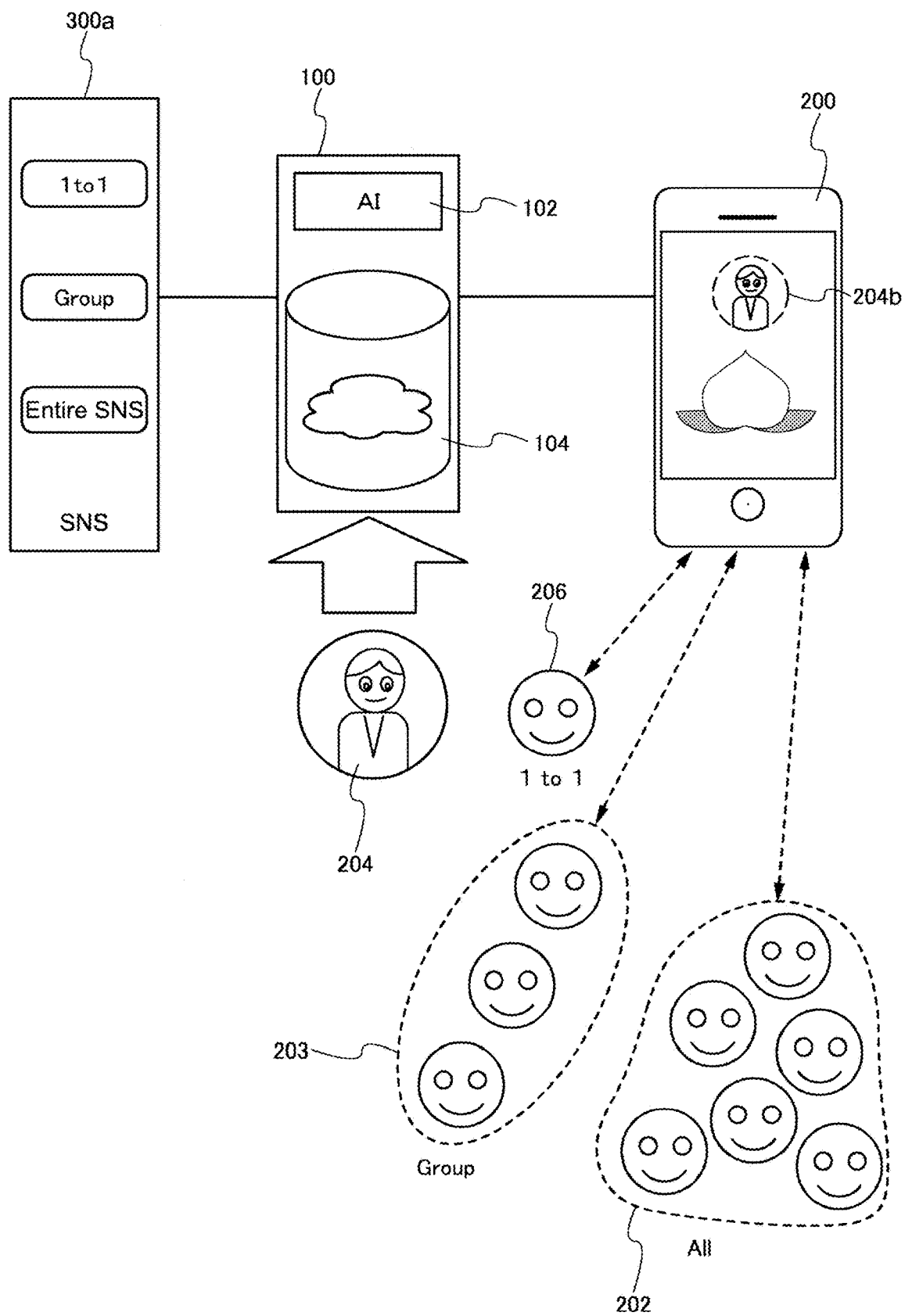
FIG. 2 is a diagram showing a disclosure range of information in the case where a first user and a second user are both users registered in a social networking service in the artificial intelligence system related to one embodiment of the present invention.

In the case when the artificial intelligence system 100 acquires information related to the first user 204 and stores it in the database 104, the range of disclosure of the information is also stored in the database 104. FIG. 2 shows the disclosure range of information in the case when the first user 204 and the second user 206 are both users registered in a site of a SNS 300a. When the second user 206 has a one-on-one conversation with a virtual first user 204b via the artificial intelligence system 100, an image based on the personality model which is generated by the personal social data of the first user 204 is displayed on the screen of the terminal device 200 of the second user 206. For example, in the case where the second user 206 has a conversation with the virtual first user 204b related to "Momotaro" (it means "peach boy") which is a Japanese fairy tale (In that story, "Momotaro" is born from peach.), an image of "peach" imagined from "Momotaro" by the first user 204 is displayed on the terminal device 200 of the second user 206. In this way, the second user 206 can know not only the image of "Momotaro" which is conceptualized by the second user 206 during the conversation, but can also know the image of "Momotaro" which is imagined by the conversation partner, and therefore an achieve a more intimate communication by understanding the partner. In this case, the content of the conversation by exchanging these messages if it is a one-to-one message exchange is disclosed only to the second user 206.

In the case when the first user 204 has a conversation with a specific group 203 belonging to the SNS 300a, an image conceptualized by the first user 204 from the contents of the conversation is displayed on the screen of each terminal device 200 of a plurality of users belonging to the specific group 203 the same as that described above. On the other hand, even if a third party who is registered with the artificial intelligence system 100 but does not belong to the SNS 300a accesses the artificial intelligence system 100, the content of the conversation is not provided to the third party.

On the other hand, in the case when the first user 204 communicates in a state where anyone can browse via the SNS 300a, the content of the conversation is provided from the artificial intelligence system 100 to any user of the SNS 300a. For example, in the case when the first user 204 has a conversation with another user in a state where it can be browsed by any user belonging to the SNS 300a, an image conceptualized by the first user 204 from the contents of the conversation similar to that described above is displayed on the screen of the terminal device 200 of the plurality of users 202 who access the artificial intelligence system 100.

In either case, it is preferred that the plurality of users 202 who are provided with a service from the artificial intelligence system 100 are users who simultaneously use at least one or more site of the SNS 300. The artificial intelligence system 100 is for acquiring social data of each of the plurality of users 202 from at least one site of the SNS 300 which is provided to the public. That is, when the plurality of users 202 participating in the community of at least one site of the SNS 300, they can receive a service provided via the artificial intelligence system 100.

In the present embodiment, the virtual first user 204b which is generated based on the personal social data of the first user 204 can be considered as being realized via the artificial intelligence system 100. From another view point, it can also be assumed that the virtual first user 204b exists on a computer program or an application program which is executed by the artificial intelligence system 100. Alternatively, the virtual first user 204b can also be assumed as being realized by hardware resources which form the artificial intelligence system 100 and software resources executed on the hardware resources.

Figure 3:
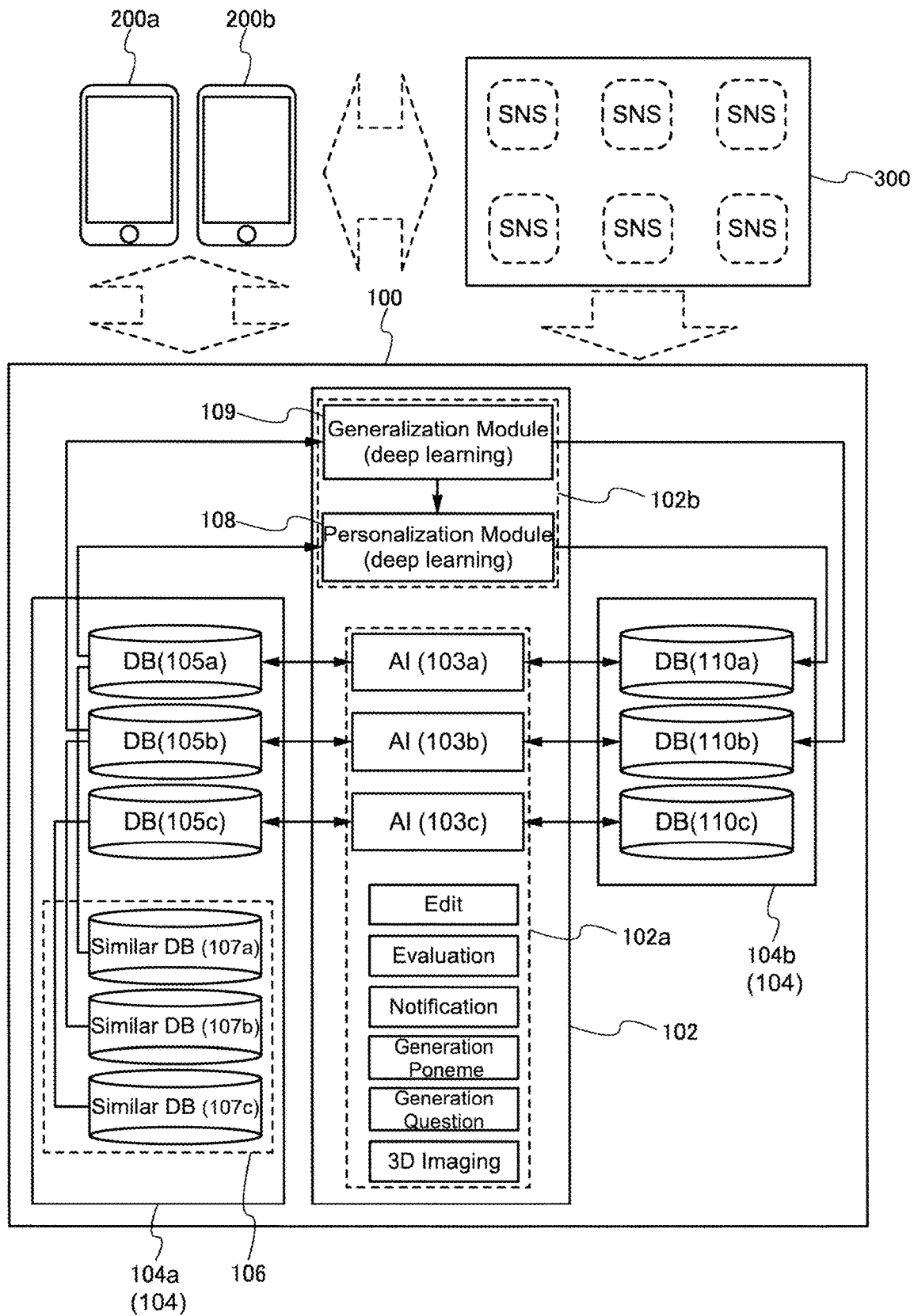
FIG. 3 is a diagram showing a functional structure of an artificial intelligence system related to one embodiment of the present invention.

FIG. 3 shows a functional structure of the artificial intelligence system 100 according to the present embodiment. The artificial intelligence system 100 includes an information processing module 102 having an artificial intelligence function and the database 104. The information processing module 102 encompasses a first information processing module 102a and a second information processing module 102b. The first information processing module 102a has a function for generating data related to languages from social data registered in one or more site of the SNS 300. The second information processing module 102b has a function for generating data related to images based on social data of users registered in one or more site of the SNS 300. In addition, the database 104 includes a first database 104a and a second database 104b. The first database 104a mainly stores social data (including the personal social data of a first user and other user's social data) and the second database 104b stores image data which is generated or extracted by machine learning.

Furthermore, in the artificial intelligence system 100 shown in FIG. 3, the database 104 is realized by a memory module such as a hard disk, a semiconductor memory and a magnetic memory, or the like, or a storage device, and the information processing module 102 is realized by a computer which is realized by a central processing unit (CPU) or a calculation processing unit including the same function. Here, the information processing module can also be considered as a hardware resource, or a functional block which is realized by a computer using hardware resources and software resources, and may also be called an information processing unit or information processing means. The same is applied to units denoted as a module below in this specification.

The artificial intelligence system 100 is in a state where it is possible to bidirectionally communicate with a plurality of users (terminal devices 200a, 200b exemplified in FIG. 3). In other words, the terminal devices 200a, 200b can communicate with the artificial intelligence system 100 and the SNS 300. On the other hand, from the viewpoint of the artificial intelligence system 100, it is in a state where it is possible to communicate with a plurality of terminal devices 200a, 200b and can obtain social data from the SNS 300.

In the artificial intelligence system 100, the first database 104a includes at least a region for storing social data. The first database 104a is functionally formed to further include a first sub-database 105a, a second sub-database 105b and a third sub-database 105c. Information related to personal social data is stored in the first sub-database 105a, information related to social data is stored in the second sub-database 105b, and the third sub database 105c may similarly include social data or may store various information obtained by crawling the Internet. The information stored in the third sub-database 105c includes words, vocabulary and fixed sentences which are used in communication as dictionary data.

The first sub-database 105a, the second sub-database 105b and the third sub-database 105c store information in which the contents of a conversation included in social data such as questions and responses (or inquiries and responses) are correlated. In addition, social data which is unilaterally transmitted such as personal tweets are stored.

Generally, tweets are not usually responses to questions. In this case, tweets are parsed and decomposed into each subject, object, place and time, and adjective phrase expressing an aspect, and a response to a question which asks about a subject, object, place and time or adjective phrase expressing an aspect may be generated and information related to the first user 204 may be stored in a database. For example, let us assume that the first user 204 tweets that "My sister made a contract to purchase a car yesterday". At this time, the subject is "my sister", the object is "car" and "contract", and the adverb phrase expressing time is "yesterday". Then, the question "Who did it?" is generated, and the response "my sister" is generated, the question "When did she do it?" is generated, and the response "yesterday" is generated, the question "What was to be purchased by the contract?" is generated, and the response "a car" is generated, the question "What did you do?" is generated and the response "made a contract to buy a car" is generated and it is possible to accumulate each response in a database.

The first database 104a includes a similar database 106. The similar database 106 stores similar questions as one group, and correlates and stores responses to that group. The similar database 106 may be divided into a first similar sub-database 107a, a second similar sub-database 107b, and a third similar sub-database 107c corresponding to the first to third sub-databases described previously. In this case, the first sub-database 105a is corelated with the similar sub-database 107a, the second sub-database 105b is correlated with the second similar sub-database 107b, and the third sub-database 105c is correlated with the third similar sub-database 107c respectively.

The first information processing module 102a exhibits an artificial intelligence function linked with the first database 104a. In addition, the first information processing module 102a has an editing function for response of the virtual first user 204b, an evaluation function of the responses, a notification function of the evaluation result, a phoneme generation function for reproducing the audio of a user, a question generation function for generating new questions, and a three-dimensional imaging function for generating a three-dimensional image of a user.

The second information processing module 102b is input with social data existing in the SNS 300 as learning data. The learning data may be acquired directly from the SNS 300 or may be acquired from the first database 104a (specifically, the first sub-database 105a and the second sub-database 105b). The second information processing module 102b learns about a specific event or a plurality of event which are included in social data by deep learning. The second information processing module 102b is form so that a neural network forms a plurality of layers. Deep learning is performed in order from the first layer of the neural network, and when learning of one layer is completed, the next layer is learned. For example, in deep learning, when image recognition is performed, local features such as edges are extracted in the first layer of the neural network, and more global features (concepts) can be identified the further up the layer exists.

In addition, the second information processing module 102b can learn by combining image data which is included in social data and text data and/or audio data. For example, if the text data "red apple" is included together with an image of an "apple", then it is possible to learn that apples have the characteristic (idea) of red. In this way, by learning not only image data but also text data attached to image data, it is possible to improve the accuracy of image recognition.

The second information processing module 102b includes a personalization module 108 and a generalization module 109. The generalization module 109 learns social data of a user who is registered in one or more site of the SNS 300 as a learning material and generates or extracts a generalized model from the social data. The generalized model is image data in which a majority of natural people can have the same idea towards a certain object and includes data which is displayed as an image. The generalized model is, for example, an image that can distinguish "apple" as an "apple" and is an image that can distinguish "cat" as a "cat". The second information processing module 102b stores the generalized model which is obtained by learning social data in the generalized model database 110b of the second database 104b. In this way, the second information processing module includes the personalization module for personalizing a general model into a model which is suitable for a first user based on the social data of the first user, and a generalized module which is input with social data of other users as learning data and generates a general model which is modeled by machine learning.

In the second information processing module 102b, the personalization module 108 acquires personal social data of the first user 204 who is registered in one or more site of the SNS 300 as a learning material. The personalization module 108 has a function which is similar to the generalization module 109 with respect to deep learning. The personalization module 108 learns by image data included in the personal social data or by combining image data with text data and/or audio data. In addition, the personalization module 108 may also have a function for reflecting a learning result of the personal social data acquired from the generalized model database 110b in the generalized model and generating a personality model. The personalization module 108 learns the personal social data acquired from the SNS 300 as learning material and generates a personality model or extracts it from the social data. The personalization model is image data in which the person himself imagined against a certain thing and includes data to be displayed as an image. That is, the second information processing module has a function for creating an image conceptualized by a virtual user with respect to a thing or event using the data stored in the second database. The second information processing module 102b stores the personality model which is obtained by learning the personal social data in the personality model database 110a of the second database 104b.

The generalized model which is generated by the second information processing module 102b and the personality model may be the same or different. For example, as an example, while an image of a "red apple" is created in a generalized model with respect to "apple", in the personality model, an image of a "green apple" may also be created reflecting the content of the personal social data. The personalization model may create with emphasis on personal social data when the personal social data contains many images related to a "green apple" and data of conversation, or the latest personal social data contains many images related to a "green apple" and data of conversation. [0049] Furthermore, apart from the personality model database 110a and the generalized model database 110b, the second database 104b may also include a general image database 110c in which image data obtained by crawling the Internet is stored.

Figure 4:
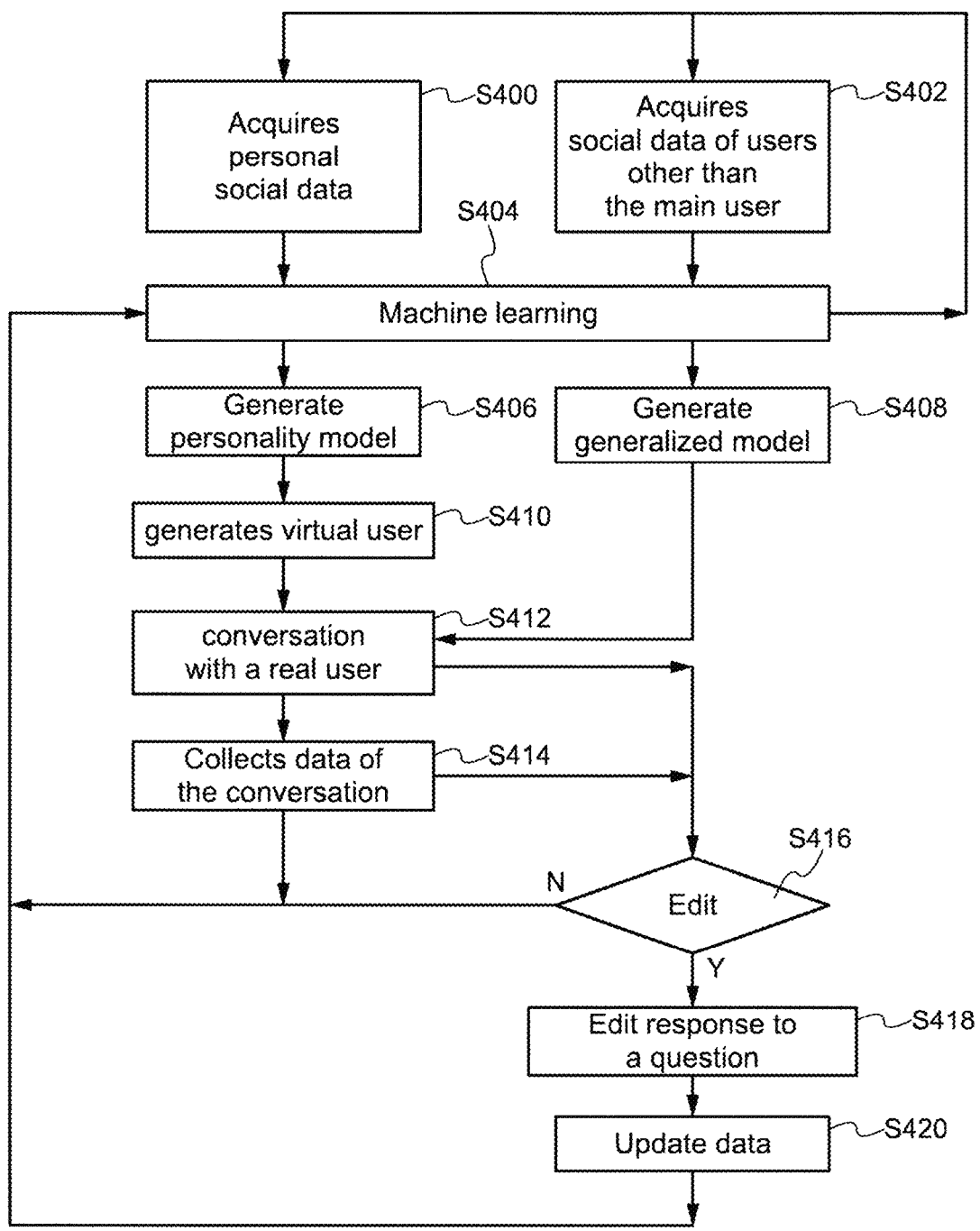
FIG. 4 is a flowchart for explaining the flow of processes performed by an artificial intelligence system related to one embodiment of the present invention.

FIG. 4 shows a flow chart for explaining the flow of processes which are performed by the artificial intelligence system 100. The artificial intelligence system 100 acquires personal social data from the SNS 300 (S400). In addition, the social data of users other than the main user is acquired (S402). The artificial intelligence system 100 machine learns the acquired personal social data and social data (S404). Machine learning includes deep learning. By these processes, a personality model is generated based on the personal social data (S406), and a generalized model is generated using the social data of a plurality of people other than the main user (S408).

The artificial intelligence system 100 generates a virtual user on a computer using personalized data (S410). The virtual user which is generated on a computer system has a conversation with a real user (S412). The real user includes the user themselves or another user. The virtual user becomes takes the place of a main person and has a conversation with a person who accessed the system based on the personalized data. The artificial intelligence system 100 collects data of the conversation (S414). Next, machine learning is performed using the data of the conversation as a learning material (S404). By repeating this routine, a virtual user repeatedly learns and masters a natural conversation more similar to the main user.

The artificial intelligence system 100 has a function for editing the content of a conversation received and responded to by a virtual user. In the case when it is judged that the user themselves wishes to edit the contents of the conversation (S416), the response to a question is edited (S418). Next, the content of the edited conversation is updated personal social data as updated data (S420), and machine learning is performed (S404). In this way, it is possible to accurately reflect the intentions of the real user.

In this way, the artificial intelligence system according to the present invention can generate a virtual person on a computer system based on information acquired from an SNS, and can communicate with a real user and a user other than the real user. That is, the virtual first user which is generated on a computer by the first information processing module and the second information processing module can have a conversation with the first user and other users apart from the first user. In this case, it is possible to display to a conversation partner not only text and audio data, but also an image which a personal conceptualizes towards for a certain thing or event appearing in the conversation as an imagine through the virtual person. In other words, the artificial intelligence system 100 can give an unprecedented impact to the conversation partner by further providing visual information (non-language) or by providing visual communication only in addition to communication by text and audio.

Database

Figure 5:
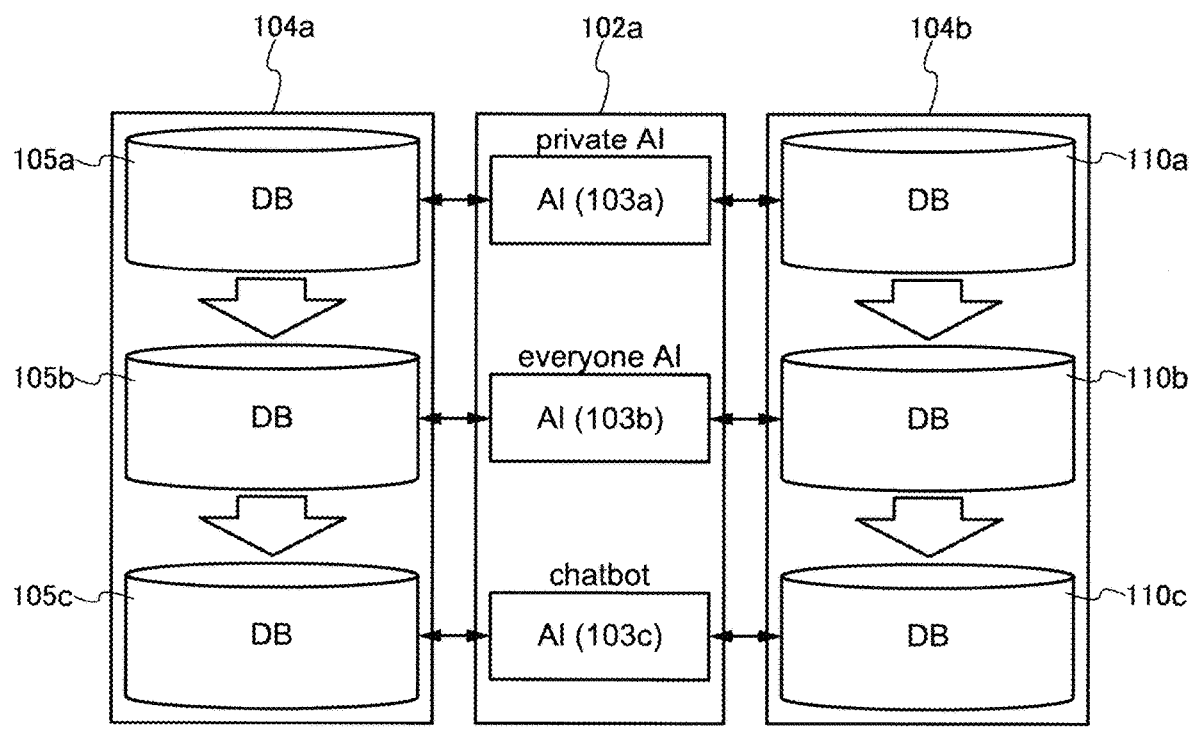
FIG. 5 is a diagram showing a structure of a first database and a second database in an artificial intelligence system related to one embodiment of the present invention.

FIG. 5 shows a structure of the first database 104a and the second database 104b in the artificial intelligence system 100. The first database 104a and the second database 104b are respectively hierarchized.

In the first database 104a, the first sub-database 105a is a database corresponding to an individual and is stored with personal social data. The personal social data which is stored in the first sub-database 105a is also used as basic data when generating virtual user data in the artificial intelligence system 100. The personal social data and information generated therefrom are stored in the first sub-database 105a for each user. In addition, the information which is generated from the personal social data includes one or more from a vector obtained by analyzing the personal social data with a keyword, a vector obtained by analyzing the personal social data with a concept, a vector obtained by analyzing the personal social data by type, and a vector obtained by analyzing the personal social data by group.

The data which is stored in the first sub-database 105a includes personal social data acquired from one or more site of the SNS 300. For example, the first sub-database 105a stores a comment posted by a user to one site of the SNS 300, the content of communication exchanged on at least one or more site of the SNS 300 between the user and another user, and information such as a tweet of the user. In addition, as described above, questions and responses are generated and stored.

Social data of a plurality of users is stored in the second sub-database 105b. The data which is stored in the second sub-database 105b includes social data of each user acquired from the SNS 300. The amount of data which is stored in the second sub-database 105b is large compared to the first sub-database 105a. The second sub-database 105b is located hierarchically below the first sub-database 105a.

In addition, the third sub-database 105c stores in advance, for example, information obtained by scrolling the Internet such as words, vocabulary and fixed sentences used in communication as dictionary data. That is, the third sub-database 105c stores a plurality of text data. The data which is stored in the third sub-database 105c may be arbitrary text data set in advance or may be a collection of text with high occurrence frequencies among text which appears on the SNS. For example, text with high occurrence frequencies may be collected from real-time communication called a chat which is exchanged in the SNS.

For example, audio data and text data which has been converted from audio data included in image data may be stored in the third sub-database 105c. In addition, when a user updates photos and movies to some site of the SNS 300, comments may be attached at the same time, and in some cases comments from other users to the comments may be attached. In addition, imaging locations and their contents may be attached as tags to photographs, movies and audio.

Therefore, when text data is generated from photograph data and movie data, it is possible to store data such as tags and comments attached to this data as text data in a database. In addition, location information (country name, place name and the like) and date information where photograph data and movie data are acquired can be stored in the database as text data. In other words, it is possible to generate text data based on one or more of audio data, photograph data and movie data and store the data in a database. This type of third sub-database 105c is located hierarchically below the first sub-database 105a.

In the second database 104b, the personality model database 110a stores a personality model which is obtained by learning personal social data acquired from the SNS 300 as learning material. The personalization model is mainly image data, and in addition may also be data obtained by combining images and characters and/or audio. The data stored as the personality model is used when a virtual user has a conversation with a main person or another user.

In the second database 104b, the generalized model database 110b stores a generalized model which is obtained by learning social data which is acquired from the SNS 300 as learning material. The generalized model is mainly image data, and in addition may also be data obtained by combining images and characters and/or audio. This generalized model database 110b is arranged hierarchically below the personality model database 110a.

The general image database 110c is image information obtained by scrolling the Internet, and includes image data such as photographs which are posted on various sites. This image data is stored in correlation with things or events. For example, in the case of an "apple", the image data of an apple is stored in correlation with the text data "apple" or a symbol indicating apple. This general image database 110c is arranged hierarchically below the generalized model database 110b.

Information Processing Module

In the structure shown in FIG. 5, the first database 104a and the second database 104b are linked with an operate in cooperation with the first information processing module 102a which has an artificial intelligence function. The first information processing module 102a may be hierarchized into a first information processing sub-module 103a, a second information processing sub-module 103b and a third information processing sub-module 103c. In this case, the first information processing sub-module 103a is in the same hierarchical level (highest hierarchy) as the first sub-database 105a and the personality model database 110a in which personal social data is stored, and functions as artificial intelligence which reflects the personality of an individual. The first information processing sub-module 103a can also be expressed as "Private AI" or "Personalized AI". The second information processing submodule 103b is in the same hierarchical level as the second sub-database 105b and the generalized model database 110b in which social data is stored and operates as an artificial intelligence which reflects characteristics as an aggregate of all users. The second information processing submodule 103b can also be expressed as "Everyone AI" or "Common sense AI". In addition, the third information processing sub-module 103c operates together with the third sub-database 105c and the general image database 110c and can be viewed as a so-called chat bot.

This type of first information processing module 102a generates a virtual person on a computer using social data stored in the first database 104a and communicates with an actual user. The first information processing module 102a which has an artificial intelligence function has a function for recognizing text data which is stored in the first sub-database 105a for example and creating or generating responses to questions. The first information processing module 102a at this time has a function for inferring or learning and determining an appropriate response to a question from text data stored in the first sub-database 105a using a calculation processing device. In addition, the first information processing module 102a reads an image which corresponds to a thing or an event appearing during a conversation from the personality model database 110a, and displays the image on the screen of a terminal device of the partner of the conversation. In this way, since the first information processing module 102a displays to the partner of the conversation not only text or audio data which is the content of the conversation, but also a conceptualized image from the content of the conversation by the first user who is one of the subjects of the conversation, it is possible to increase the amount of information provided to the conversation partner.

The first information processing module 102a receives a question from the second user with respect to the virtual first user, and creates or generates a response to the question. In the case when it is determined that there is no appropriate data in the first sub-database 105a and the personality model database 110a, the first information processing module 102a shifts to the second sub-database 105b and generalized model database 110b which are in lower position in the hierarchy, and searches for a response and related images to the question. Furthermore, in the case where it is judged that there is no appropriate response, the process shifts to the third sub-database 105c and the general image database 110c which are further lower in the hierarchy, and searches for a response to the question.

Figure 6:
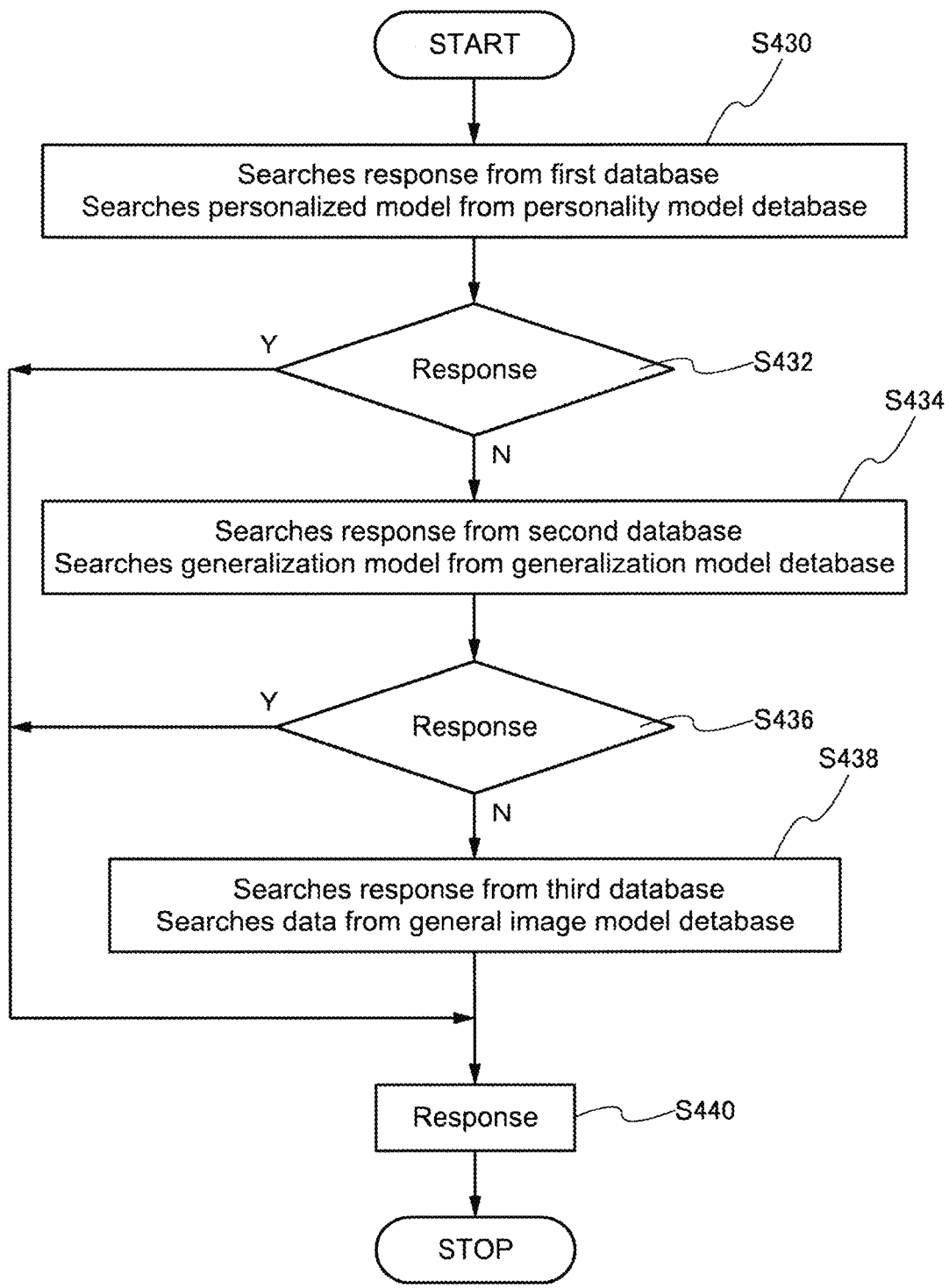
FIG. 6 is a flowchart for explaining the flow of processes performed by an artificial intelligence system related to one embodiment of the present invention, and shows an example of searching a first database and a second database and creating a response to a question.

An example of a process for searching the first database 104a and the second database 104b and creating a response to a question is shown by a flowchart. Each step as shown in the flowchart is explained below while referring to FIG. 6.

First, when the first information processing module 102a creates or generates a response to a certain question, the first information processing module 102a first searches the first sub-database 105a for a suitable response to the question, and searches for image data recalled from the question or the response from the personality model database 110a (S430). If a response is obtained from the first sub-database 105a and the personality model database 110a, a response which most accurately reflects the thinking, thoughts, emotions and ideas. of the first user is created (S440).

In the case when a suitable response to the question is searched from the first sub-database 105a, a question which matches the question and the character string among the questions stored in the first database 104a is searched, and it is possible to search for a response correlated with the searched question. Alternatively, even if a question does not perfectly match the question and the character string among the questions stored in the first sub-database 105a, it is possible to perform a search by determining whether or not they match taking into consideration a certain degree of fluctuation in notation. In addition, among the questions accumulated in the first sub-database 105a, it is also possible to search for one which has the largest number of words included in the question. In this case, in addition to the number of words, it is also possible to search in consideration of the word order. In addition, it is also possible to analyze the meanings of the questions accumulated in the first sub-database 105a and the subject question and search for one which has the closest meaning. For example, as an analysis of the meaning, it is possible to include deriving a logical conclusion based on a predetermined logical system from a response as a conclusion, or deriving a condition on which the response is based. In this way, there are cases where "response is inferred and determined" in the case of detecting a response and in the case of including the fact that the character string does not completely match. In addition, there are cases where "response is learned and determined" in the case where the character string matches perfectly.

In addition, in order to select an appropriate personalization model from the personality model database 110a, a noun (ordinary noun, proper noun) or a noun phrase which is included in the response detected from the first sub-database 105a is extracted as described above, and a personalization model corresponding to a nominal or noun phrase is searched and selected. For example, in the case of responding "I like strawberries" to the question "What is your favorite fruit?", image data of the strawberry which the first user conceptualizes is selected from the personalization models stored in the personality model database 110a.

When the first information processing module 102a cannot obtain an appropriate response from the first sub-database 105a and the personality model database 11a (S432), the first information processing module 102a searches the second sub-database 105b and the generalization model database 110b which are lower in the hierarchy (S434). The response which is obtained from the second sub-database 105b can show the trend of how the majority of users respond to a specific question and an average and reasonable response can be obtained. For example, in response to the question "What is your favorite fruit?", in the case where there are many responses of "I like melons", the first information processing module 102a can select a similar response from the second sub-database 105b as a response to the question, and can select an image of melons which is generally conceptualized from the generalized model database 11b and use it as a response. Although the above description is an example of a simple question, if it is based on the second sub-database 105b and the generalized model database 110b, since the response tendency of a large number of users is reflected, it is possible to obtain a response in line with the current flow (S440).

When a response cannot be found from the second sub-database 105b and the generalized model database 11b (S436), the first information processing module 102a searches the third sub-database 105c and the general image database 110c (S438). Since a significantly large amount of data is stored in the third sub-database 105c and the general image database 110c, it is possible to select responses from them. Next, the selected one is used as a response (S440).

Estimate of Similar Questions

The first database 104a correlates and stores a question and a response to the question. However, it is usual that questions in human social communication and responses to those questions are not uniform. For example, in the case when asking the name of a person who is being met for the first time, the question "Who are you?" may be asked and the question "Please tell me your name" may also be asked.

In one embodiment of the present invention, a mechanism for selecting a response to a corresponding question when this type of similar question is asked is arranged. For example, there is no sense of something wrong with the response "I am Annie" to either "Who are you?" and "Please tell me your name" previously mentioned. This mechanism may also be constructed as a similar database 106 as explained in FIG. 3. In the similar database 106, similar questions are grouped as similar questions, and responses corresponding to similar questions are correlated. The first information processing module 102a can select a response to questions from the similar database 106. By adopting such a structure, it is possible to appropriately select responses to questions.

Figure 7A:
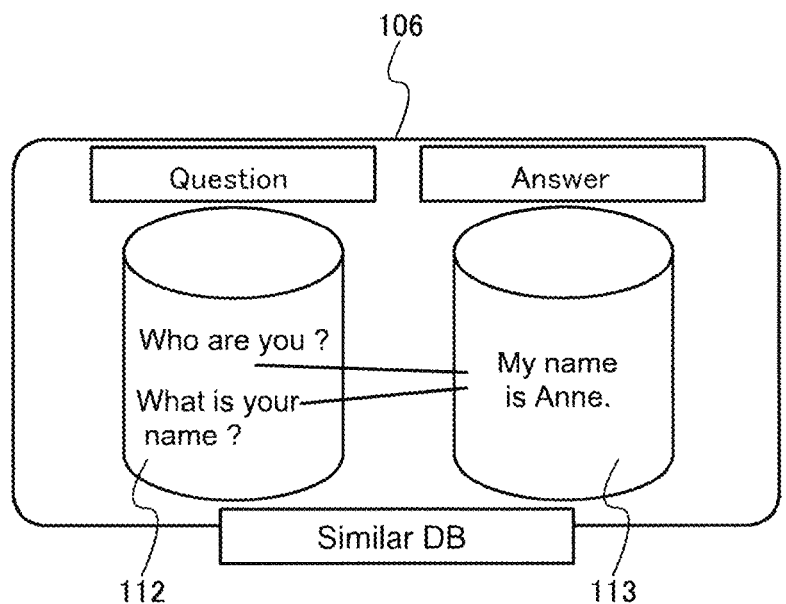
FIG. 7A is a diagram showing a structure of a similar database in an artificial intelligence system related to one embodiment of the present invention.

FIG. 7A shows an example of the similar database 106. The similar database 106 includes a similar question database 112 which stores questions, and a similar response database 113 which stores responses. As another form, a region where questions are stored and a region where responses are stored may also be arranged in the similar database 106.

A plurality of questions is stored as data in the similar question database 112. The plurality of questions is correlated with similar questions and stored together as one group. For example, "Who are you?" and "Please tell me your name" mentioned previously are correlated and stored as similar questions. The similar response database 113 stores the response content to questions, that is, a plurality of responses as data. For example, the response "I am Annie" mentioned previously is stored. Response data is correlated with a specific question in the similar response database 113. According to the example described above, the questions "Who are you?" and "Please tell me your name" are put together as one group, and the response "I am Annie" is corelated as the response to the question.

Figure 7B:
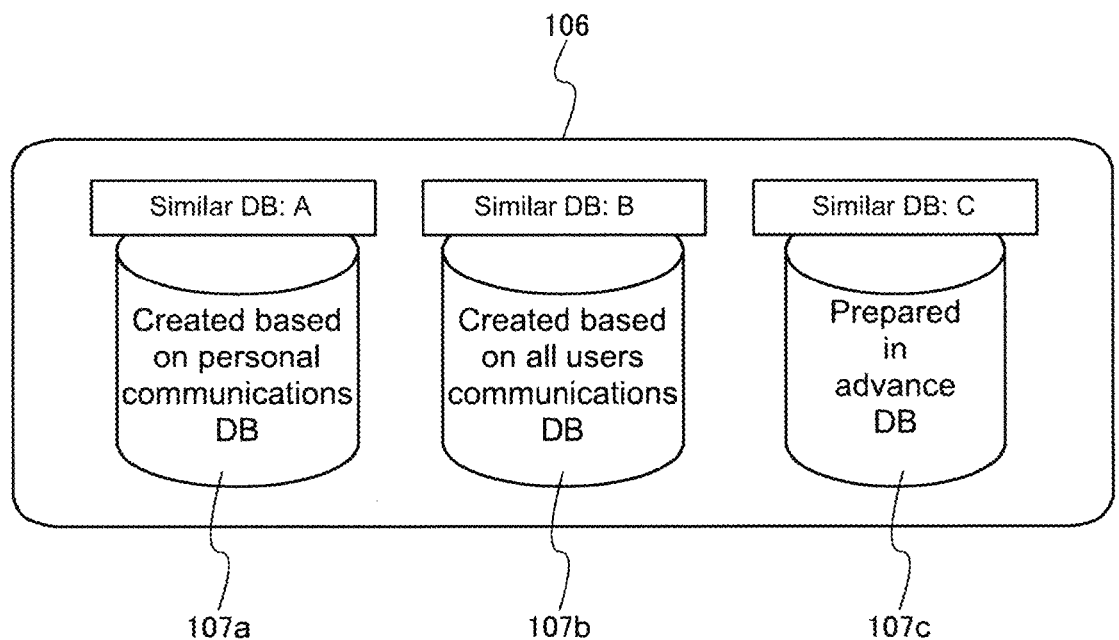
FIG. 7B is a diagram showing a structure of a similar database in an artificial intelligence system related to one embodiment of the present invention.

FIG. 7B shows another form of the similar database 106. For example, in FIG. 7B, the similar database 106 may be hierarchized into a first similar sub-database 107a corresponding to the first sub-database 105a, a second similar sub-database 107b corresponding to the second sub-database 105b, and a third similar sub-database 107c corresponding to the third sub-database 105c.

The first similar sub-database 107a is created based on personal social data which corresponds to personal users. Text data from a chat included in the personal social data, text data from the contents of a textualized conversation and text data corresponding to a question sentence, and text data corresponding to a response sentence are stored. In this case, as is explained in FIG. 7A, similar question sentence data within the text data corresponding to a question sentence is grouped and stored in a question database, and response sentence data corresponding to the questions is stored in a response database and correlated.

The second similar sub-database 107b is created based on the social data of a plurality of users. Text data from a chat included in the social data of a plurality of users, or text data from the contents of a textualized conversation and text data corresponding to a question sentence, and text data corresponding to a response sentence are stored. As is explained in FIG. 7A, the second similar sub-database 107b also groups and stores similar question sentence data within the text data corresponding to a question sentence in a question database, and response sentence data corresponding to the questions is stored in a response database and correlated.

Furthermore, it is also possible to change the data which is stored in the second similar sub-database 107b based on a change in the social data which is stored in the first similar sub-database 107a. For example, even if the question "Hello, how are you?" and the response "Hello, I'm fine" are set as a question and response pair, when many users respond, "I'm not too bad", it is also possible to change the data which is stored in the second similar sub-database 107*b* based on the social data. In this case, according to the characteristics (personality) of the user, it may be divided into a case of being easy to be influenced by other users and a case where it is difficult to be influenced. This function can be carried out by adding a user attribute analysis function to the first information processing submodule 103*a*.

The third similar sub-database 107*c* stores a plurality of text data. The plurality of text data may also be text data comprised of a question sentence prepared in advance and a response sentence corresponding to the question. This text data may also be text data that is result of collecting text data which has a high rate of appearing on an SNS. As was explained in FIG. 7A, in the third similar sub-database 103*c* also groups and stores similar question sentence data within the text data corresponding to a question sentence in a question database, and response sentence data corresponding to the questions is stored in a response database and correlated.

In this way, the similar database 106 is preferred to be hierarchized into the first similar sub-database 107*a* in which data obtained by categorizing the content of questions and responses from the first user's personal social data is stored, the second similar sub-database 107*b* in which data is obtained by categorizing the content of questions and responses from the social data of a plurality of users, and the third similar sub-database 107*c* in which data obtained by categorizing the content of questions and responses from text data is stored.

According to the present embodiment, estimating that the same responses are sufficient to a plurality of questions means combining and correlating questions and responses. By adopting this type of process, it is unnecessary to store a combination of a question and its response in all cases, and it is possible to save storage capacity. In addition, it is possible to quickly access responses to questions.

Furthermore, in the artificial intelligence system 100 according to the present embodiment, the first information processing module 102*a* references the second sub-database 105*b*, and in the case where it is estimated that there are many responses from many users have the same contents, a function for automatically updating a question item to the response may be added to the similar database 106. In this way, by updating the similar database by referencing the social data of a plurality of users, it is possible to make the combination of a question and a response which are estimated to be similar more accurate and improve the accuracy of communication.

Evaluation of Responses Created by the System

The artificial intelligence system 100 may have an evaluation module in which the first user 204 who the main person is and the second user 206 who a user is other than the main person can evaluate and edit an image towards a thing conceptualized by a virtual user and the content of a response to a question output from the artificial intelligence system 100.

Figure 8:
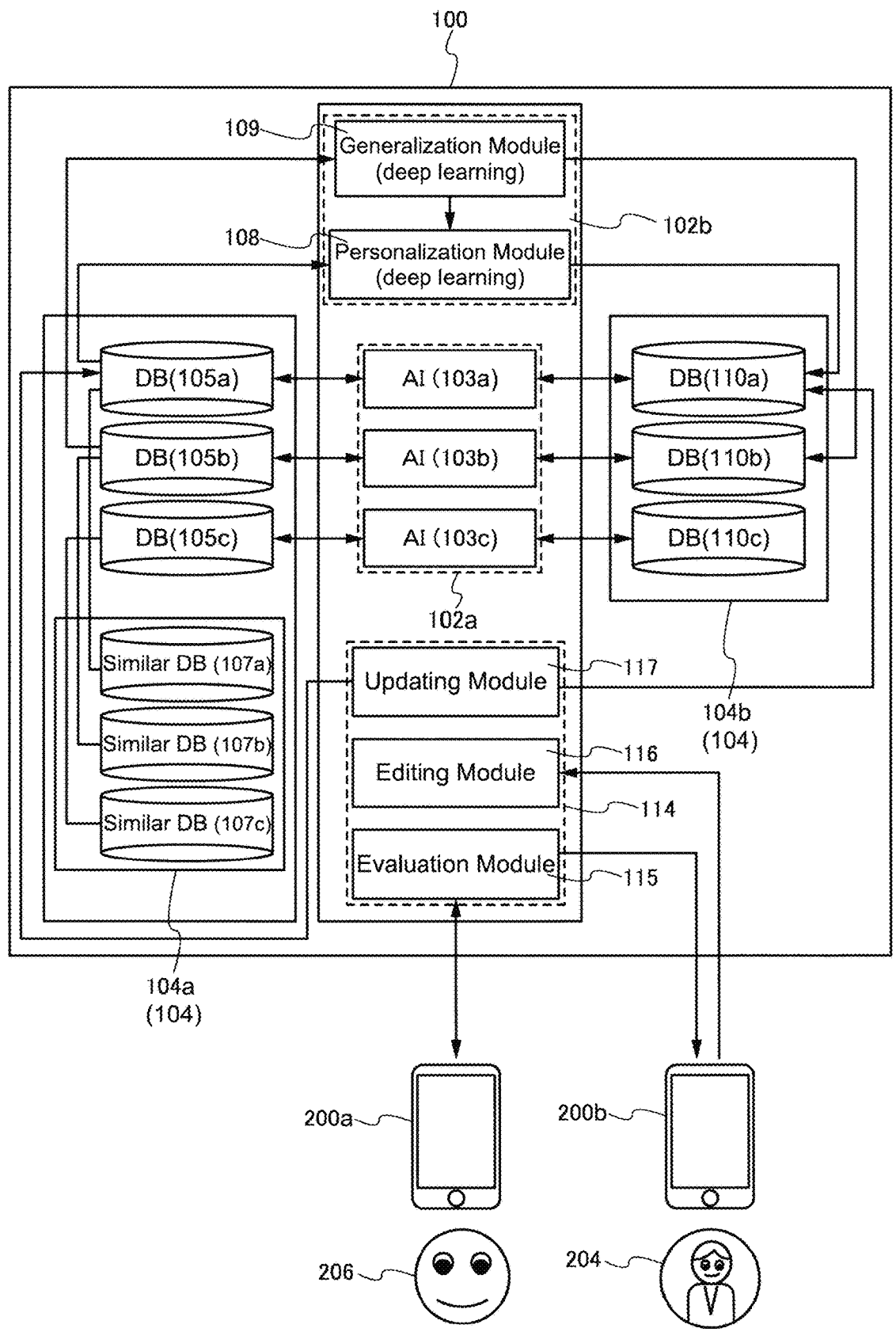
FIG. 8 is a diagram showing a functional structure of an evaluation and editing module include in an artificial intelligence system related to one embodiment of the present invention.

FIG. 8 shows a functional structure of an evaluation and editing module 114 included in the artificial intelligence system 100. The evaluation and editing module 114 are realized as a part of the functions included in the first information processing module 102*a*. The evaluation and editing module 114 include an evaluation module 115, an editing module 116 and an updating module 117.

Figure 9A:
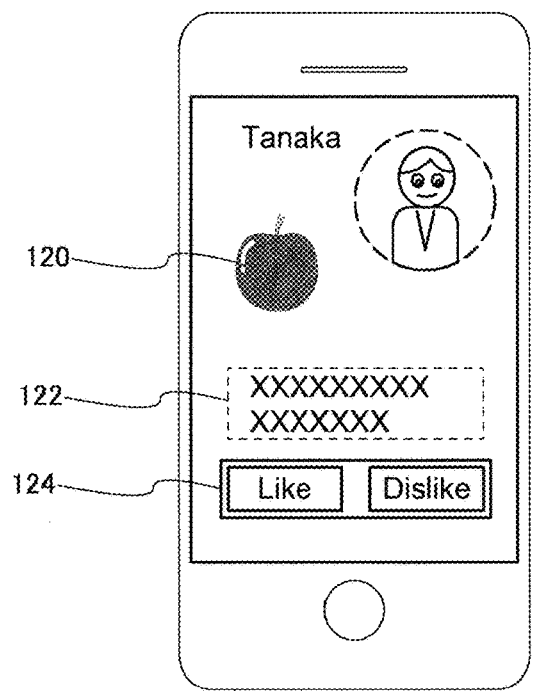
FIG. 9A is a diagram showing an example of a screen display of a terminal device shown by an artificial intelligence system related to one embodiment of the present invention.

The evaluation module 115 receives an evaluation with respect to a response which created by the first information processing module 102*a* through the terminal device 200*a* and transmitted to the partner of a conversation. The evaluation module 115 provides evaluation information to the terminal device 200*a* of the second user 206. FIG. 9A shows an example of a screen display of the terminal device 200*a*. The contents of one or both of language information 118 as a response to a question and image information 120 conceptualized by a virtual first user from the contents of the question or the response are display on a screen for evaluation, and an evaluation button 122 is displayed. A user performs an evaluation by operating the evaluation button 122. Although FIG. 9A shows an alternative form of "Like" or "Dislike" as the evaluation button 122, it may also be of a type in which a user points provides as another example. The evaluation module 115 receives evaluation information from the terminal device 200*a* correlates the evaluation result with a response and stores them in the first sub-database 105*a*. An evaluation of a response to a question can be made by all users including the main user.

The first user 204 can know the evaluation result of a response through the evaluation module 115. The evaluation module 115 displays the evaluation result on a terminal device 200*b* of the first user 204. The first user 204 can reference the evaluation result and can edit the contents of the response to the question (response made by the virtual first user 204*b*). For example, this editing mode can be used in the case where the evaluation with respect to a response is low or in the case when the first user 204 who is the main user felt that the response is unfavorable and wishes to correct it.

Figure 9B:
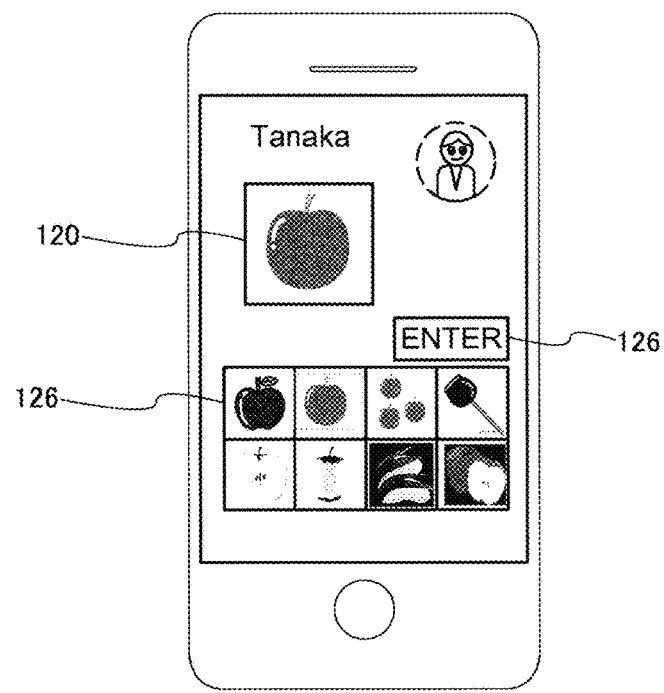
FIG. 9B is a diagram showing an example of a screen display of a terminal device shown by an artificial intelligence system related to one embodiment of the present invention.

The editing module 116 provides editing information to the terminal device 200*b* of the first user 204. In FIG. 9B, as an example of a screen display of the terminal device 200*b*, a form is shown in which the image information 120 which is conceptualized by the virtual first user 204, a thumbnail image 124 of a correction candidate, and a selection button 126 are displayed from the contents of a question or response. The first user 204 can select another image by referencing the thumbnail image 124, and transmits the editing information to the editing module 116 by operating the selection button 126. For example, it is possible to select an image of "apple" which is the currently set from among the thumbnail images 124 displayed as another candidate. The update module 117 updates the data stored in the personality model database 110*a* based on the editing information. The main user can perform editing of responses to questions.

Figure 10:
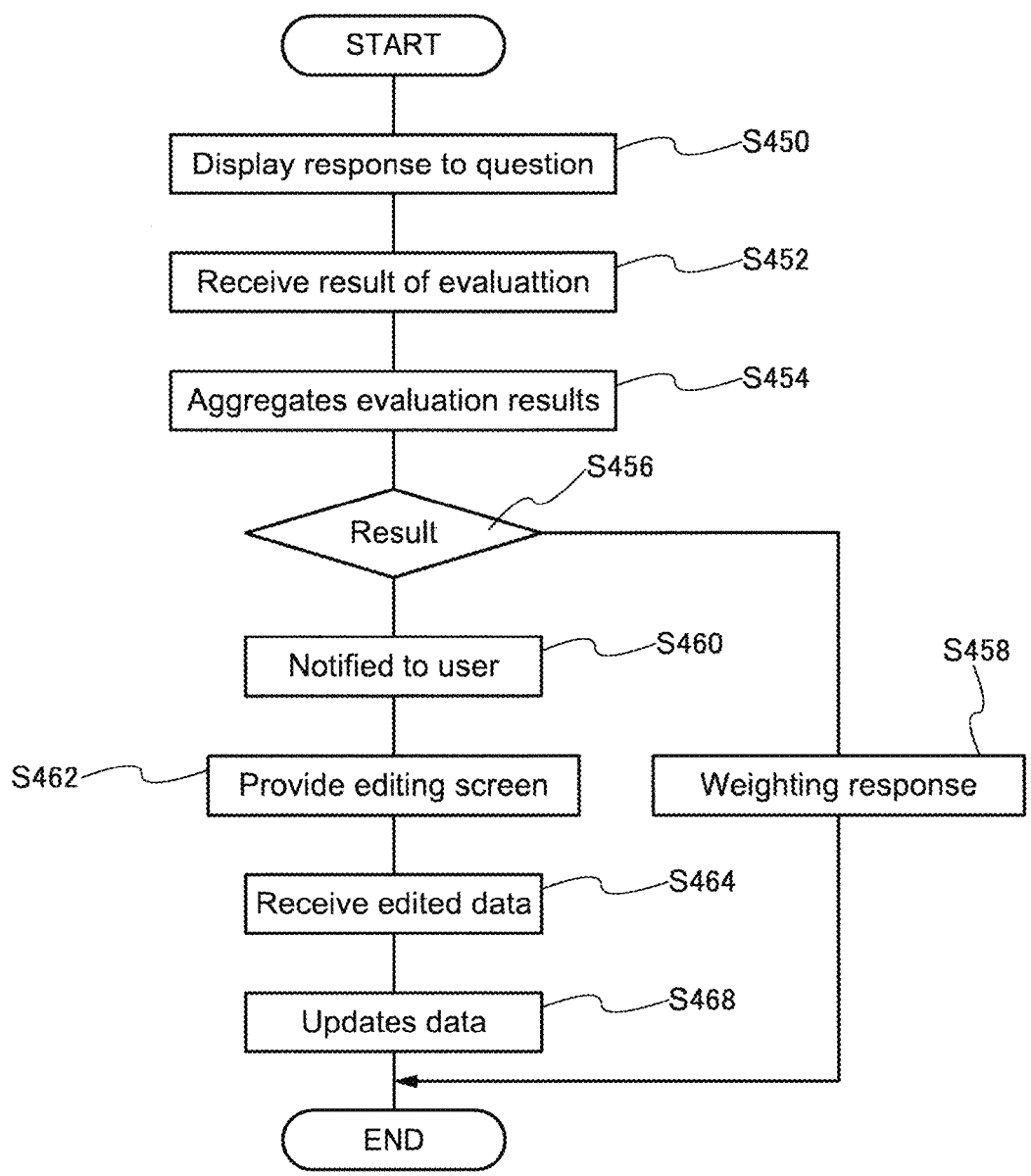
FIG. 10 is a flowchart for explaining the flow of processes performed by an artificial intelligence system related to one embodiment of the present invention, and shows a flow of an evaluation and editing process of a response to a question.

FIG. 10 shows a flow of an evaluation and editing process of responses to questions performed in the artificial intelligence system 100. The evaluation and editing module 114 display a response to a question in the terminal device 200*b* of the first user (S450). The evaluation and editing module 114 receive a result evaluated by a user (S452), and aggregates the evaluation results (S454). When the evaluation value is normal or high or if the evaluation value is higher than a certain level, it may be weighted so that the response appears as a preferable response (S456, S458). The weighted response is set so that the probability of being selected during the next search is high.

When the evaluation of a response is low, this is notified to the first user 204 (S460), and an editing screen is provided to the terminal device 200*b* (S462). The first user 204 who receives the notification edits the content of the response. The evaluation and editing module 114 receive the edited data from the terminal device 202*b* of the first user (S464). Next, the evaluation and editing module 114 updates the data which is stored in the first sub-database 105a or the personality model database 110a (S468).

An evaluation of responses to questions shows a confrontational relationship in which other users other than the main user evaluates a response to a question and the first user edits a response to a question. However, the embodiment of the present invention is not limited to this, and the first user can have a conversation with the virtual first user 204b which is generated on the artificial intelligence system 100, ask himself a question, and can perform evaluation and editing by herself.

By this type of process, the first user 204 can know the content of a response to a question, can evaluate the response, and can edit the response to ensure that a preferable response can be obtained. That is, it is possible to make it learn the virtual first user 204b which is generated on the artificial intelligence system 100. Furthermore, the first user 204 may also browse the result of evaluating a response to a question by another user other than the main and may edit the result so that the evaluation value is further improved.

In this way, the artificial intelligence system 100 can create new response sentences when a user edits the data obtained by correlating a question and a response. In this case, a user can make the artificial intelligence function learn so as to make an appropriate response to a question while having a conversation with pseudo-self which is generated on the artificial intelligence system 100. In this case, the first user 204 edits a response to a question while having a conversation with the virtual first user 204b which is generated on the artificial intelligence system 100, and can make the first information processing module 102a learn having the function of artificial intelligence.

Flow of Conversation

Figure 11:
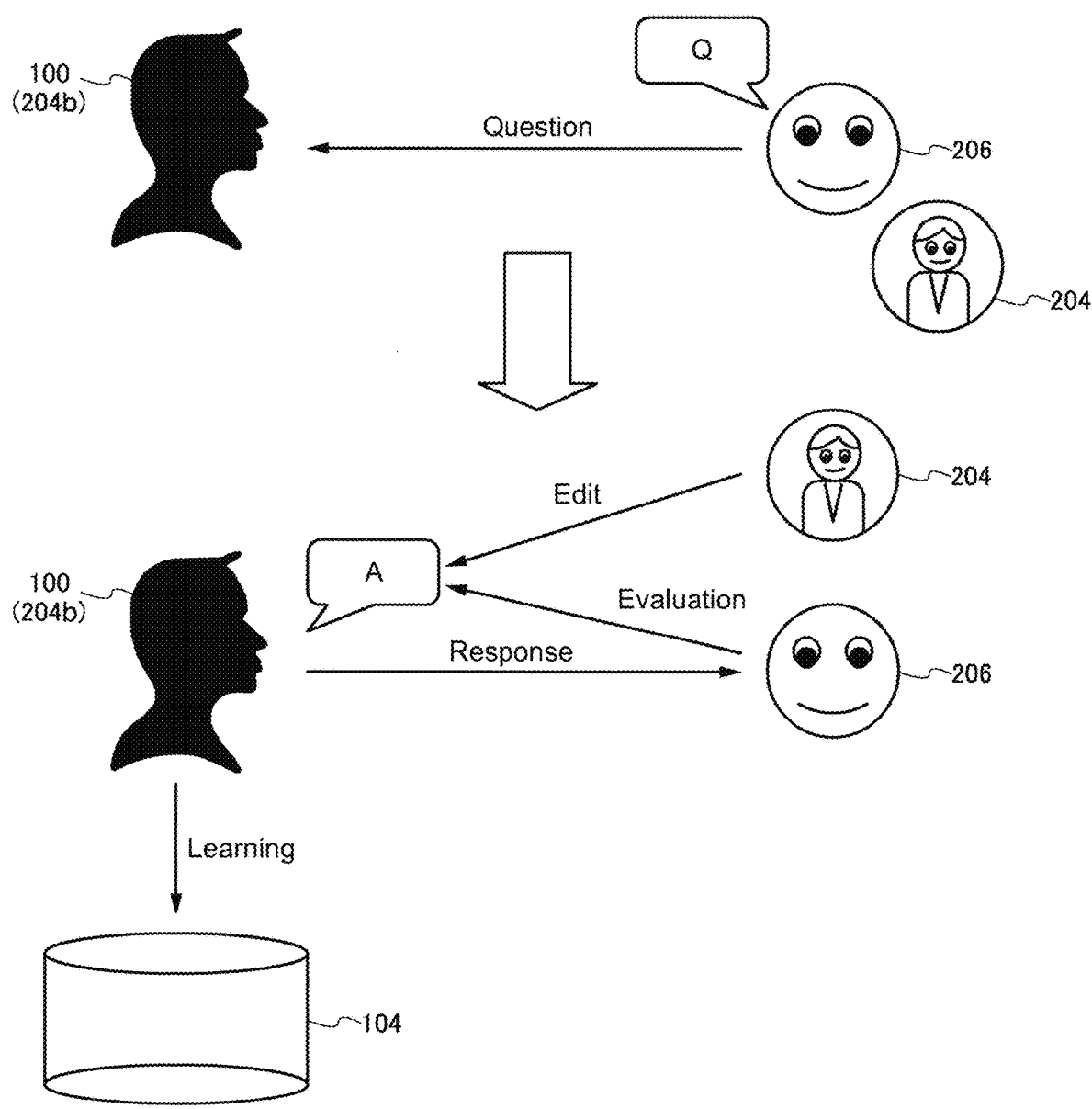
FIG. 11 is a diagram showing a flow of a conversation between a user and an artificial intelligence system related to one embodiment of the present invention.

FIG. 11 shows the flow of a conversation between the artificial intelligence system 100 and a user. A user (the first user 204 or the second user 206) has a conversation with the virtual first user 204b which is generated on the artificial intelligence system 100. At this time, the user asks the virtual first user 204b questions using some words. When this question is asked, images may also be combined as well as words. The virtual first user 204b generates a response to the question and responds to the user (the first user 204 or the second user 206). The conversation continues by this repetition. In addition, the user (the first user 204 or the second user 206) who receives the response edits the content of the response. When the response is edited, the virtual first user 204b learns the edited content. The results of learning are accumulated in the database 104. The virtual first user 204b can respond more appropriately by repeating learning and the variation in responses also increases.

Figure 12:
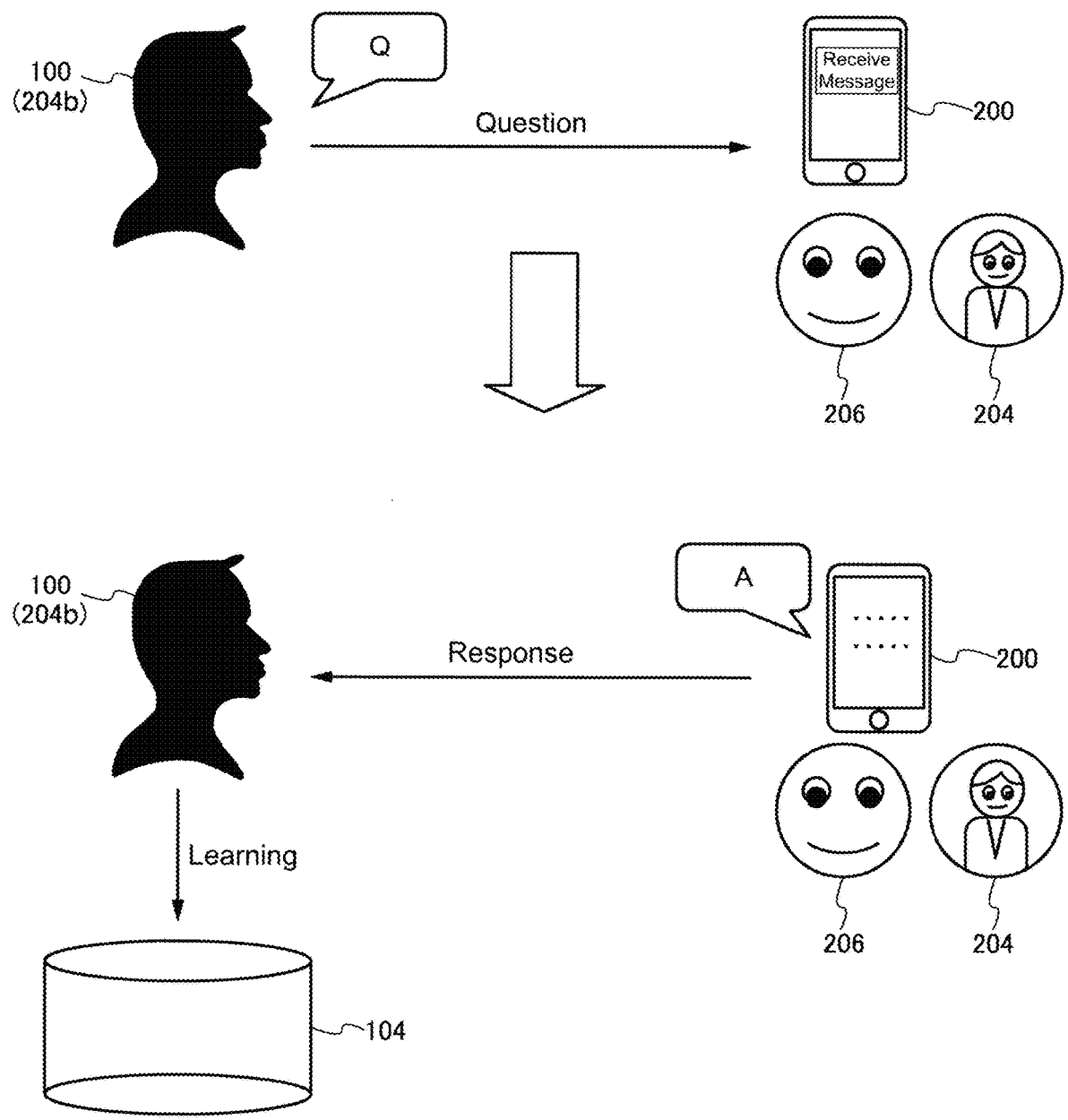
FIG. 12 is a diagram showing a flow of a conversation between a user and an artificial intelligence system related to one embodiment of the present invention.

A conversation can be started from the virtual first user 204b side as another form as is shown in FIG. 12. In this case, as is shown in FIG. 3 and FIG. 5, the first information processing module 102a which is the subject which generates the virtual first user 204b, extracts data corresponding to "greetings" from data of past conversations in accordance with the order of priority in the order of the first sub-database 105a, the second sub-database 105b and the third sub-database 105c, and makes works of a speech. The speech by the virtual first user 204b is displayed as a push notification on the display screen of the terminal device of the user (the first user 204 or the second user 206). In this case, sound and/or vibration may be combined in addition to a screen display in the terminal device 200. The user (the first user 204 or the second user 206) responds to the speech of the virtual first user 204b. The virtual first user 204b who has received a response learns the content of the response. The results of learning are accumulated in the database 104. The virtual first user 204b can respond more appropriately by repeating learning and the variation in responses also increases.

Figure 13:
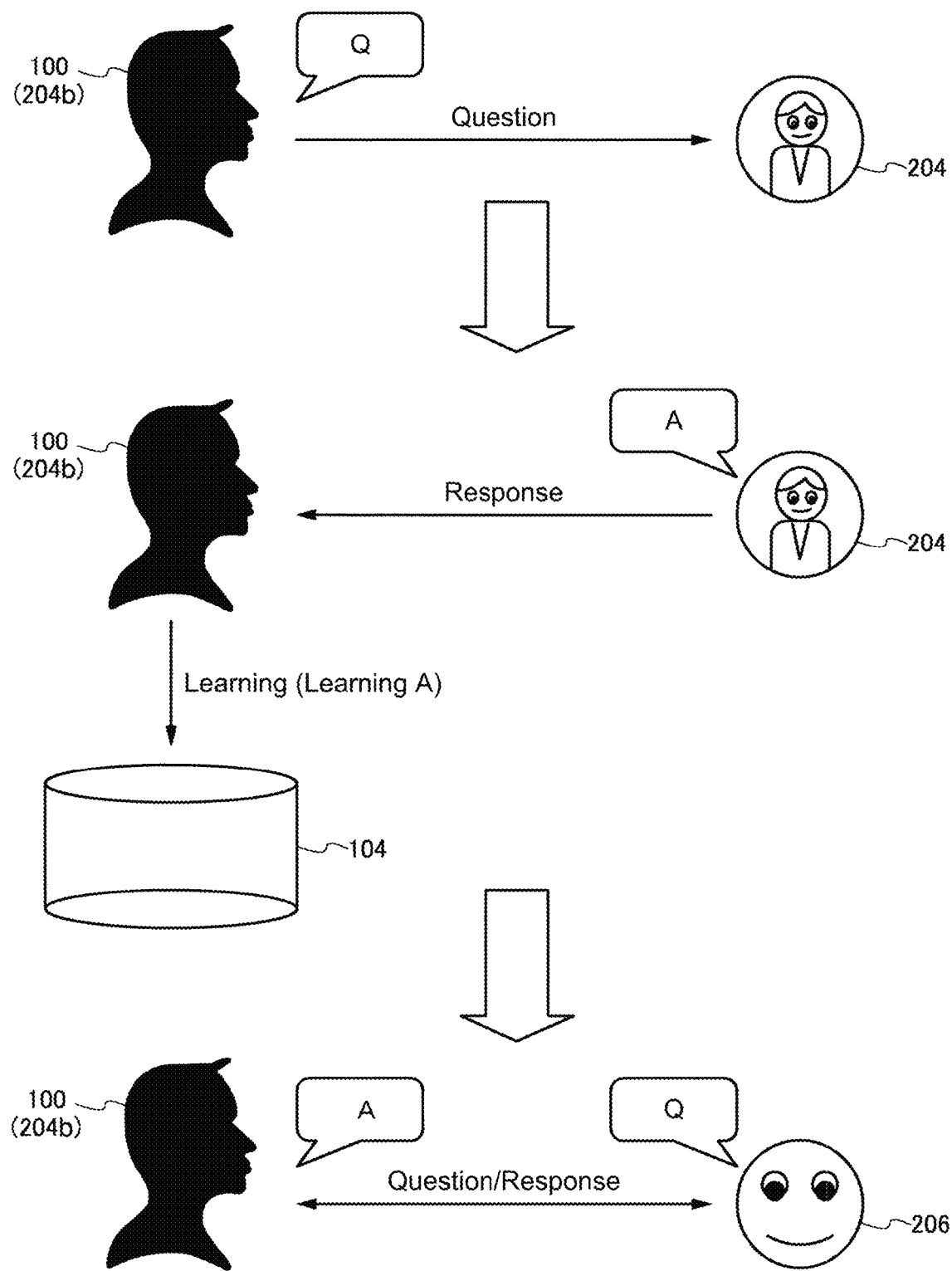
FIG. 13 is a diagram showing a flow of a conversation between a user and an artificial intelligence system related to one embodiment of the present invention.

FIG. 13 shows an example in which the virtual first user 204b has a conversation with the first user 204 who is the user himself and learns through the conversation. For example, the virtual first user 204b asks the first user 240 who is the user himself a question "What is your favorite sport?". On the other hand, in the case where the first user 204 who is the main user responds with "I also like baseball, but I like basketball the most", the virtual first user 204b learns the content of this response. At a different opportunity, when the virtual first user 204b has conversation with the second user 206 who is another person, the question "What is your favorite sport?" asked to the second user 206 is responded to by the virtual first user 204b with "I also like baseball, but I like basketball the most". By repeating this learning, the virtual first user 204b becomes more like the main user, and it is possible to have a conversation in accordance with the personality of the main user.

Furthermore, according to an embodiment of the present invention, if the database 104 for generating a virtual user generated by the artificial intelligence system 100 is made to learn expert knowledge, it is possible to provide various services by the virtual user. These expert knowledge may also be learned from an SNS which is used by the user.

For example, if at least one expertise knowledge in each field such as natural science, humanities, psychology, law, finance and engineering and the like is stored as a special knowledge in a database which generates a virtual user, it is possible to ensure that the virtual user can use this expert knowledge. Furthermore, the expert knowledge in this case is preferred to be not only uniform expert knowledge accumulated by books and the like but also includes information of expert knowledge which a natural person cause in a conversation on a social network. By including information related to expert knowledge in the form of this type of conversation, it is possible for the artificial intelligence system 100 beneficially utilize various expert knowledge as a response to a question.

Furthermore, this expert knowledge can be acquired as the knowledge of a pseudo-first user which is generated by artificial intelligence, in the case where the first user for example wishes it. In this case, the pseudo-first user can not only merely obtain specific expert knowledge but can also utilize the form in which the personality of the first user is taken into account. For example, in the case when the first user has knowledge of the medical field, that intelligence also includes the pseudo-first user having expertise in the medical field, and if the pseudo-first user can further acquire expert knowledge in the field of law as expert knowledge, then it is possible to demonstrate abilities in the field of forensics.

In this case, as is shown in FIG. 3 and FIG. 5, the expert knowledge which is stored in the first sub-database 105a may be stored in a question and response (that is, Q&A) format. Since the social data (knowledge) which is stored in the first sub-database 105a can be updated in a timely manner and the data is never lost, it is possible to increase the amount of knowledge.

Furthermore, by reflecting the information of the second sub-database 105b which stores social data of all users in the first sub-database 105a in which this type of expert knowledge is stored, and by improving the learning effect, it is possible to output more appropriate responses.

As expert knowledge, it is possible to make knowledge of various fields such as judicial, administrative, medical, environmental and economic compatible with the attributes of users. That is, according to one embodiment of the present invention, it is possible to make a virtual person who has high expert knowledge appear on a communication providing system according to the attributes of the users and provide a service to other users.

What is claimed is:

1. An artificial intelligence system comprising:
a first processor configured to generate data related to a language based on social data of a first user registered in one or a plurality of social network services;
a second processor configured to generate data related to an image based on social data of the first user registered in one or a plurality of social network services;
a first memory configured to store social data of the first user and social data of an other user registered in the one or the plurality of social network services; and
a second memory configured to store a personalization model, a generalization model, and general image data obtained by crawling the internet,
wherein the second processor includes a third processor configured to generate the personalization model suitable to the first user by machine learning based on social data of the first user, and a fourth processor configured to obtain social data of the other user as learning data and generate the generalization model modelled by machine learning,
wherein the first processor and the second processor are configured to generate a virtual first user on a computer with respect to the first user.

2. The artificial intelligence system according to claim 1, wherein the first memory includes a first sub-memory configured to store social data of the first user, a second sub-memory configured to store social data of the other user, and a third sub-memory configured to store data obtained by the first processor crawling the internet.

3. The artificial intelligence system according to claim 2, wherein the first processor is configured to deduce and generate an appropriate response to a question from among data stored in the first memory by reading out at least a part of data stored in the first memory.

4. The artificial intelligence system according to claim 1, wherein the second processor is configured to read out data stored in the second memory and create an image conceptualized by the first virtual user with respect to a thing or an object.

5. The artificial intelligence system according to claim 3, further comprising a third memory configured to group together similar questions as similar questions and correlate and store the similar questions with responses to the similar questions,
wherein the first processor is configured to select a response to a question from the third memory.

6. The artificial intelligence system according to claim 5, wherein the third memory includes a fourth memory configured to group together and store similar question content, and a fifth memory configured to store responses to the similar questions.

7. The artificial intelligence system according to claim 5, wherein the third memory has a hierarchy including a fourth sub-memory configured to store data obtained by classifying a question and a response from among social data of the first user, a fifth sub-memory configured to store data obtained by classifying a question and a response from among social data of a plurality of users, and a sixth sub-memory configured to store data obtained by classifying a question and a response from among text data.

8. The artificial intelligence system according to claim 1, wherein the second processor is configured to generate the personalization model and the generalization model by deep learning.

9. The artificial intelligence system according to claim 1, wherein the virtual first user generated on the computer by the first processor and the second processor is configured to have a conversation with the first user and other users apart from the first user.

10. The artificial intelligence system according to claim 9, further comprising a fifth processor configured to receive an evaluation of a content of a response of the virtual first user.

11. The artificial intelligence system according to claim 10, wherein the fifth processor is configured to notify the first user of an evaluation result of the content of the response of the virtual first user.

12. The artificial intelligence system according to claim 11, further comprising a sixth processor configured to edit the content of the response of the virtual first user when the first user receives a notification from the fifth processor, and a seventh processor configured to update the content of the response of the virtual first user based on the content edited by the sixth processor.

* * * * *